US011725727B2

(12) United States Patent
Yokoi et al.

(10) Patent No.: US 11,725,727 B2
(45) Date of Patent: Aug. 15, 2023

(54) SHIFT DEVICE AND VEHICULAR MOTOR CONTROL DEVICE

(71) Applicant: AISIN CORPORATION, Kariya (JP)

(72) Inventors: Yosuke Yokoi, Kariya (JP); Yutaka Uchida, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/664,127

(22) Filed: May 19, 2022

(65) Prior Publication Data

US 2022/0403929 A1 Dec. 22, 2022

(30) Foreign Application Priority Data

Jun. 22, 2021 (JP) .................................. 2021-102926

(51) Int. Cl.
*F16H 61/12* (2010.01)
*F16H 61/32* (2006.01)
*F16H 61/00* (2006.01)

(52) U.S. Cl.
CPC ............. *F16H 61/12* (2013.01); *F16H 61/32* (2013.01); *F16H 2061/005* (2013.01); *F16H 2061/1208* (2013.01); *F16H 2061/1224* (2013.01); *F16H 2061/1292* (2013.01)

(58) Field of Classification Search
CPC .... F16H 61/12; F16H 61/32; F16H 2061/005; F16H 2061/1208; F16H 2061/1224; F16H 2061/1292
See application file for complete search history.

(56) References Cited

U.S. PATENT DOCUMENTS

| 2011/0205672 | A1 | 8/2011 | Sakai |
| 2012/0001484 | A1 | 1/2012 | Hsu |
| 2012/0075761 | A1* | 3/2012 | Miura ..................... H02M 1/32 327/109 |
| 2014/0062398 | A1* | 3/2014 | Satake .................. B60L 3/0046 320/109 |
| 2017/0217481 | A1* | 8/2017 | Asao .................... B62D 5/0487 |
| 2020/0263786 | A1* | 8/2020 | Sakaguchi ............. H02P 3/025 |

FOREIGN PATENT DOCUMENTS

| DE | 11 2018 005 920 T5 | 7/2020 |
| JP | 2010-74915 A | 4/2010 |

OTHER PUBLICATIONS

Extended European Search Report dated Nov. 16, 2022 in European Patent Application No. 22180458.6, citing documents 1 and 15 therein, 8 pages.

* cited by examiner

*Primary Examiner* — Edwin A Young
(74) *Attorney, Agent, or Firm* — Oblon, McClelland, Maier & Neustadt, L.L.P.

(57) ABSTRACT

A shift device mounted on a vehicle includes a motor configured to drive, by electric power supplied from a power supply mounted on the vehicle, a shift switching member configured to switch shift positions, a cut-off unit configured to cut off conduction of a power supply line through which the electric power is supplied to the motor, and a drive circuit unit configured to output the electric power to the motor and including a driving switching element configured to execute a switching operation. The shift device is configured to determine an abnormality of the power supply line when a voltage of the power supply line is smaller than a predetermined threshold value, turn off the driving switching element, and cut off the conduction of the power supply line by the cut-off unit.

7 Claims, 4 Drawing Sheets

SHIFT DEVICE AND VEHICULAR MOTOR CONTROL DEVICE

CROSS REFERENCE TO RELATED APPLICATIONS

This application is based on and claims priority under 35 U.S.C. § 119 to Japanese Patent Application 2021-102926, filed on Jun. 22, 2021, the entire content of which is incorporated herein by reference.

TECHNICAL FIELD

This disclosure relates to a shift device and a vehicular motor control device.

BACKGROUND DISCUSSION

In the related art, a motor control device has been known (see, for example, JP 2010-74915A (Reference 1)).

Reference 1 describes a motor control device including a drive circuit. The drive circuit supplies driving electric power to a motor based on a voltage of a power supply. The drive circuit uses a PWM inverter including a semiconductor switching element.

Although not described in Reference 1, the motor control device described in Reference 1 may detect an abnormality of a power supply line such as disconnection based on a decrease in a voltage of the power supply line. When it is determined that the abnormality of the power supply line is detected, a driving switching element is turned off in order to prevent an influence of a charge voltage of a smoothing capacitor connected to the power supply line on driving of the motor, or prevent an influence of the abnormality in the voltage of the power supply line on a driver that operates the semiconductor switching element (driving switching element) of the drive circuit.

However, when the driving switching element is turned off, the voltage of the power supply line temporarily increases due to a leakage current or the like from the driver that controls a switching operation. Accordingly, it may be erroneously determined that the power supply line is normal (the power supply is recovered). In this case, the driving switching element is turned on again as an operation in a normal state. Then, when the driving switching element is turned on again, since the increase in the voltage of the power supply line due to the leakage current is eliminated, the voltage of the power supply line that temporarily increases decreases again. As described above, an abnormality determination and a normality determination for the power supply line are repeated due to repetition of the decrease and the increase in the voltage of the power supply line, and thus it may not be possible to appropriately detect the abnormality of the power supply line.

A need thus exists for a shift device and a vehicular motor control device which are not susceptible to the drawback mentioned above.

SUMMARY

A shift device according to a first aspect of the disclosure is a shift device mounted on a vehicle. The shift device includes: a motor configured to drive, by electric power supplied from a power supply that is mounted on the vehicle, a shift switching member configured to switch shift positions; a cut-off unit configured to cut off conduction of a power supply line through which the electric power from the power supply is supplied to the motor; and a drive circuit unit configured to output the electric power from the power supply to the motor and including a driving switching element configured to execute a switching operation. The shift device is configured to determine an abnormality of the power supply line when a voltage of the power supply line is smaller than a predetermined threshold value, turn off the driving switching element provided in the drive circuit unit, and cut off the conduction of the power supply line by the cut-off unit.

A vehicular motor control device according to a second aspect of the disclosure includes: a motor configured to be driven by electric power supplied from a power supply that is mounted on a vehicle; a cut-off unit configured to cut off conduction of a power supply line through which the electric power from the power supply is supplied to the motor; and a drive circuit unit configured to output the electric power from the power supply to the motor and including a driving switching element configured to execute a switching operation. The vehicular motor control device is configured to determine an abnormality of the power supply line when a voltage of the power supply line is smaller than a predetermined threshold value, turn off the driving switching element provided in the drive circuit unit, and cut off the conduction of the power supply line by the cut-off unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to drawings.

A configuration of a shift device 100 (an example of a "shift device" and a "vehicular motor control device" in the claims) according to the present embodiment will be described with reference to FIGS. 1 to 5.

Configuration of Shift Device

Figure 1:
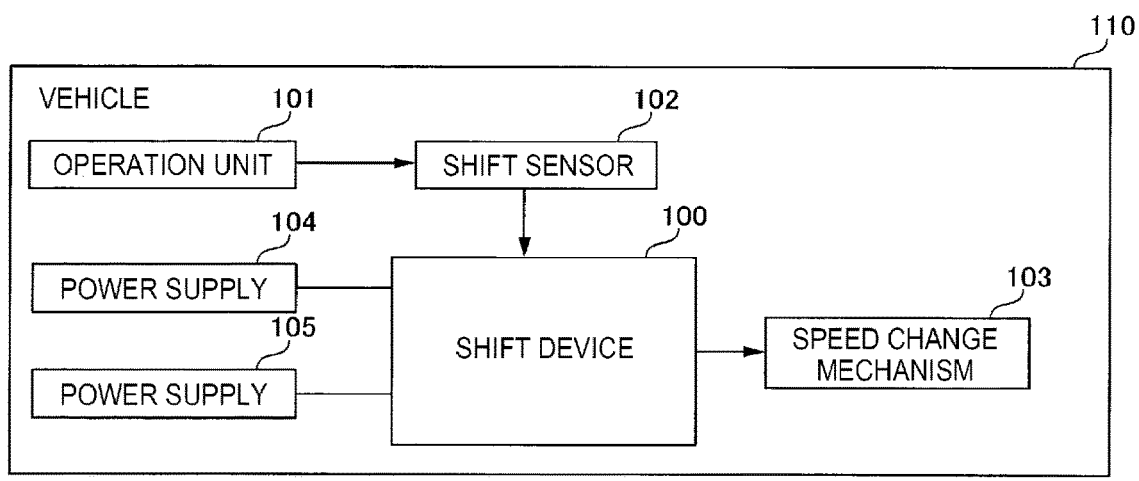
FIG. 1 is a block diagram showing an overall configuration of a vehicle according to an embodiment.

As shown in FIG. 1, the shift device 100 is mounted on a vehicle 110 such as an automobile. In the vehicle 110, when an occupant (driver) executes a shift switching operation using an operation unit 101 such as a shift lever (or a shift switch), an electrical shift switching control is executed on a speed change mechanism 103. That is, a position of the operation unit 101 (shift lever) is input to the shift device 100 by a shift sensor 102 connected to the operation unit 101. Then, based on a control signal transmitted from control units 31 and 41 (see FIG. 2) that are provided in the shift device 100 and will be described later, the speed change mechanism 103 is switched to one shift position of a parking (P) position, a reverse (R) position, a neutral (N) position, and a drive (D) position corresponding to the shift operation of the occupant. Such a shift switching control is called shift-by-wire (SBW).

Figure 2:
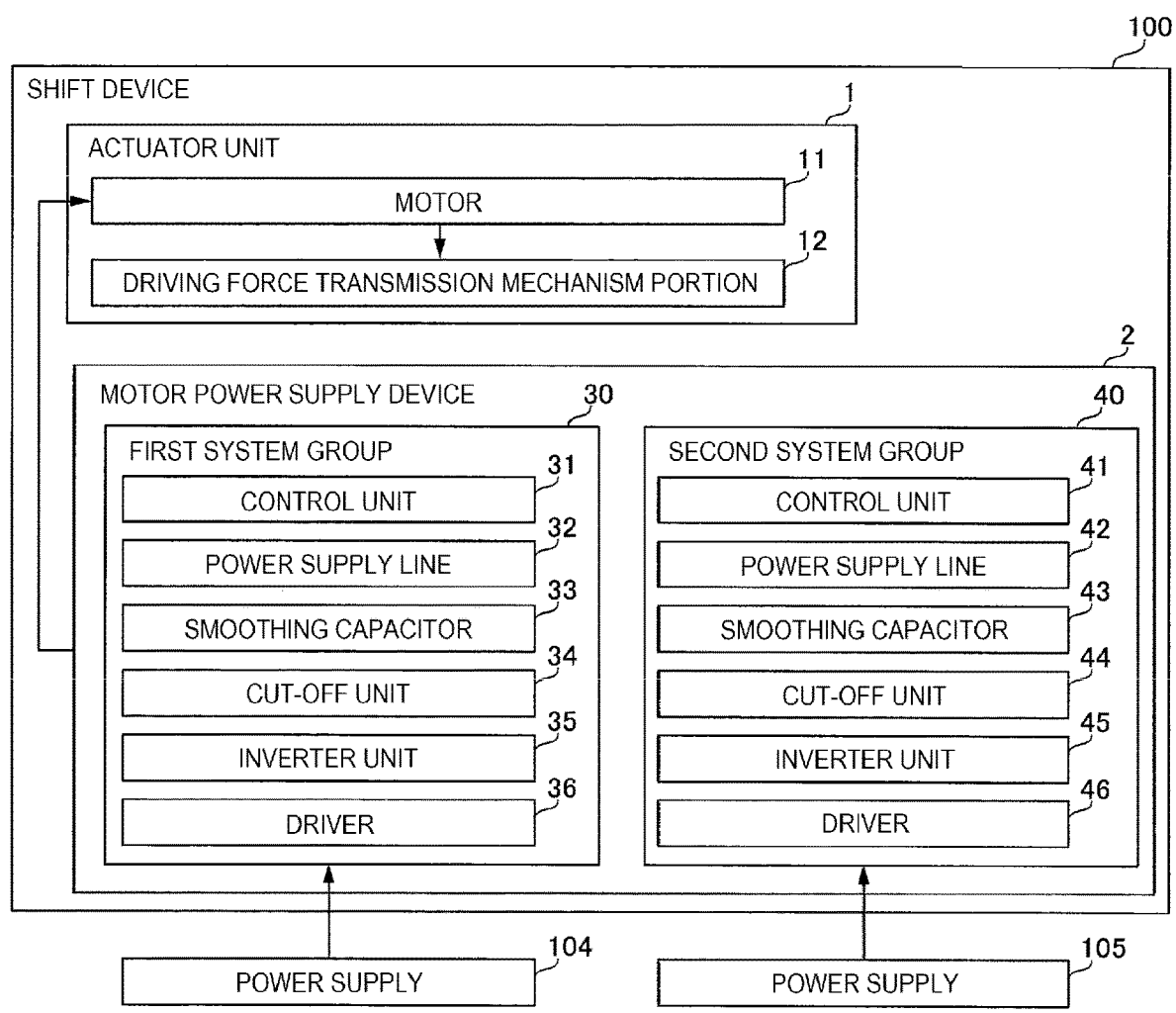
FIG. 2 is a block diagram showing an overall configuration of a shift device according to the embodiment.

As shown in FIG. 2, the shift device 100 includes an actuator unit 1 and a motor power supply device 2.

The actuator unit 1 includes a motor 11 and a driving force transmission mechanism portion 12. The motor 11 is a motor that drives a detent plate 103a (an example of a "shift switching member" in the claims) described later. The motor 11 is a surface magnet type (SPM) three-phase motor having a permanent magnet incorporated in a surface of a rotor. The motor 11 is driven by three-phase (U phase, V phase, and W phase) alternating-current electric power supplied from the motor power supply device 2. Specifically, the motor 11 includes coils U1, V1, and W1 (see FIG. 4) to which electric power from a first system group 30 of the motor power supply device 2 described later is supplied, and coils U2, V2, and W2 (see FIG. 4) to which electric power from a second system group 40 of the motor power supply device 2 is supplied. The motor 11 is driven by the electric power supplied to the coils U1, V1, and W1 and the coils U2, V2, and W2. The driving force transmission mechanism portion 12 transmits a driving force of the motor 11 to the detent plate 103a.

Figure 3:
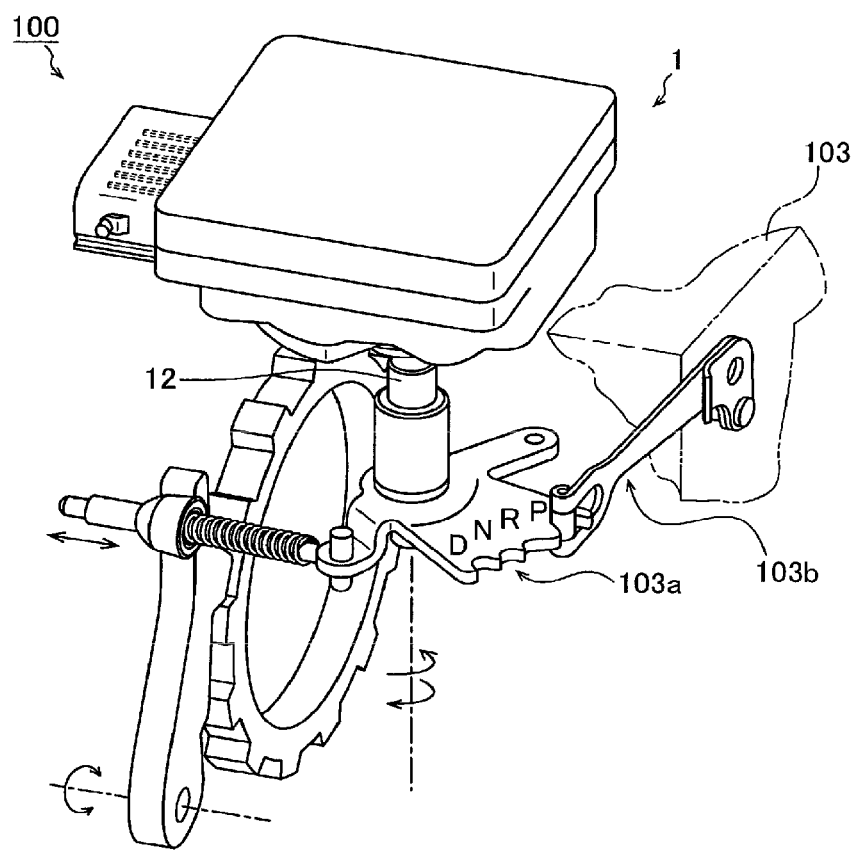
FIG. 3 is a perspective view schematically showing the shift device and a speed change mechanism according to the embodiment.

As shown in FIG. 3, the speed change mechanism 103 includes the detent plate 103a and a detent spring 103b. The detent plate 103a is driven by the actuator unit 1 to switch the shift positions. That is, the detent plate 103a is driven to mechanically switch shift states (P position, R position, N position, and D position) of the speed change mechanism 103.

Specifically, the detent plate 103a includes four valley portions corresponding to the four shift positions (P position, R position, N position, and D position) in order to switch the four shift positions. One end (base end portion) of the detent spring 103b is fixed to a casing of the speed change mechanism 103, and a roller is attached to the other end (free end) of the detent spring 103b. The detent spring 103b establishes the shift position in a state in which the roller is fitted in any of the four valley portions of the detent plate 103a. That is, the detent spring 103b holds the detent plate 103a at rotation angle positions corresponding to the P position, the R position, the N position, and the D position.

As shown in FIG. 1, the vehicle 110 is mounted with a power supply 104 and a power supply 105. Each of the power supply 104 and the power supply 105 supplies the electric power for driving the motor 11 to the motor power supply device 2. Specifically, each of the power supply 104 and the power supply 105 outputs 12V direct-current electric power to the motor power supply device 2. Each of the power supply 104 and the power supply 105 is, for example, a vehicle battery device, a lithium ion battery, or a capacitor.

Configuration of Motor Power Supply Device

As shown in FIG. 2, the motor power supply device 2 supplies the electric power to the actuator unit 1 (motor 11). The motor power supply device 2 includes the first system group 30 and the second system group 40. The first system group 30 supplies the electric power from the power supply 104 to the motor 11. The second system group 40 supplies the electric power from the power supply 105 to the motor 11. The motor 11 is driven by the electric power supplied from each of the first system group 30 and the second system group 40. The shift device 100 drives the motor 11 of the actuator unit 1 by simultaneously supplying the electric power from both the first system group 30 and the second system group 40.

The first system group 30 of the motor power supply device 2 includes the control unit 31, a power supply line 32, a smoothing capacitor 33, a cut-off unit 34, an inverter unit 35 (an example of a "drive circuit unit" in the claims), and a driver 36. The second system group 40 of the motor power supply device 2 includes the control unit 41, a power supply line 42, a smoothing capacitor 43, a cut-off unit 44, an inverter unit 45 (an example of the "drive circuit unit" in the claims), and a driver 46.

First System Group

Figure 4:
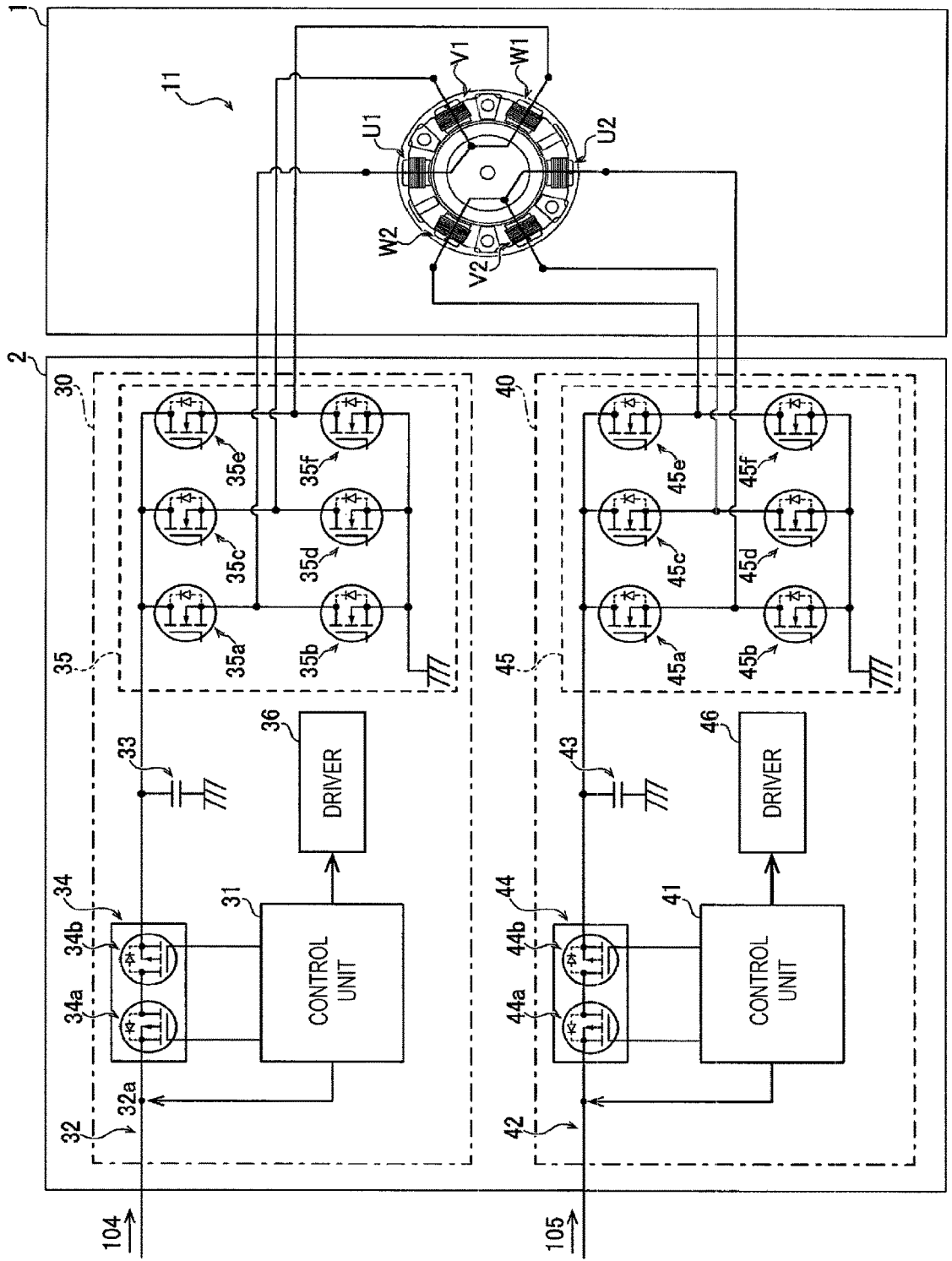
FIG. 4 is a circuit diagram showing a configuration of the shift device according to the embodiment.

As shown in FIG. 4, the power supply line 32 electrically connects the power supply 104 and the motor 11 in order to supply the electric power from the power supply 104 to the motor 11. The smoothing capacitor 33 smooths a voltage of the power supply line 32. The smoothing capacitor 33 is connected in parallel with the power supply line 32 on an inverter unit 35 side (motor 11 side) with respect to the cut-off unit 34 described later.

The cut-off unit 34 cuts off conduction of the power supply line 32. In the present embodiment, the cut-off unit 34 cuts off the conduction of the power supply line 32 between the power supply 104 and the inverter unit 35 described later. The cut-off unit 34 includes two switching elements 34a and 34b (cutoff switching elements). Specifically, the switching elements 34a and 34b execute switching operations of switching between on and off based on a signal from the control unit 31. The two switching elements 34a and 34b are connected in series such that the two switching elements 34a and 34b have opposite polarities to each other. For example, the two switching elements 34a and 34b are field effect transistors (FETs). In the cut-off unit 34, source terminals of the field effect transistors are connected to each other. That is, the cut-off unit 34 is a non-contact relay (solid state relay) using a semiconductor. In FIG. 4, a diode indicated by a broken line that is provided in each of the two switching elements 34a and 34b represents a parasitic diode (body diode) of the field effect transistor.

The inverter unit 35 outputs the electric power from the power supply 104 to the motor 11. Specifically, the inverter unit 35 converts the direct-current electric power from the power supply 104 into the three-phase alternating-current electric power. The inverter unit 35 includes six switching elements 35a, 35b, 35c, 35d, 35e, and 35f (examples of a "driving switching element" in the claims) that execute switching operations. Each of the switching elements 35a to 35f is driven by the driver 36 described later. The switching elements 35a to 35f are, for example, field effect transistors. In FIG. 4, a diode indicated by a broken line that is provided in each of the switching elements 35a to 35f represents a parasitic diode (body diode) of the field effect transistor.

In the inverter unit 35 according to the present embodiment, the switching elements 35a, 35c, and 35e (examples of a "first driving switching element" in the claims) on an upper arm side are connected in series with the switching elements 35b, 35d, and 35f (examples of a "second driving switching element" in the claims) on a lower arm side, respectively. That is, the inverter unit 35 constitutes a two-level three-phase inverter circuit by the six switching elements 35a to 35f. The inverter unit 35 outputs the converted three-phase alternating-current electric power to the U-phase coil U1, the V-phase coil V1, and the W-phase coil W1 that are provided in the motor 11. For example, an output from the switching elements 35a and 35b is input to the U-phase coil U1. An output from the switching elements 35c and 35d is input to the V-phase coil V1. An output from the switching elements 35e and 35f is input to the W-phase coil W1.

The driver 36 outputs a gate signal (PWM signal: pulse width modulation signal) for switching the switching operations of the switching elements 35a to 35f of the inverter unit 35. Specifically, the driver 36 outputs the gate signal to a gate terminal of each of the switching elements 35a to 35f based on a signal from the control unit 31 described later.

The control unit 31 is a microcomputer (microcontroller) including a central processing unit (CPU) and a memory such as a read only memory (ROM) and a random access memory (RAM). The control unit 31 outputs the signal for controlling the switching operations of the switching elements 35a to 35f of the inverter unit 35 to the driver 36.

Specifically, the control unit 31 controls the switching operations of the switching elements 35a to 35f so as to output a three-phase alternating current to the motor 11 in order to switch the speed change mechanism 103 to the shift position corresponding to the shift operation of the occupant. The control unit 31 brings the inverter unit 35 into a short brake state in order to stop the driving of the motor 11 when not receiving the shift operation that is executed by the occupant using the operation unit 101. In the short brake state, the switching elements 35a, 35c, and 35e on the upper arm side are turned off, and the switching elements 35b, 35d, and 35f on the lower arm side are turned on.

The control unit 31 outputs, to the switching elements 34a and 34b of the cut-off unit 34, a signal for controlling a cutoff operation for the conduction of the power supply line 32 that is executed by the cut-off unit 34. For example, the control unit 31 turns off the cut-off unit 34 in order to cut off the conduction of the power supply line 32 when detecting an overcurrent, a continuous energization, or the like.

In the present embodiment, the control unit 31 detects the voltage of the power supply line 32. Specifically, the control unit 31 detects the voltage at a detection point 32a of the power supply line 32 on a power supply 104 side (input side) with respect to the cut-off unit 34.

Second System Group

A configuration of the second system group 40 is the same as that of the first system group 30. That is, the control section 41, the power supply line 42, the smoothing capacitor 43, the cut-off unit 44, the inverter unit 45, and the driver 46 in the second system group 40 have the same configurations as the control unit 31, the power supply line 32, the smoothing capacitor 33, the cut-off unit 34, the inverter unit 35, and the driver 36, respectively.

Specifically, in the second system group 40, the electric power is supplied from the power supply 105 to the motor 11 through the power supply line 42. The smoothing capacitor 43 smooths a voltage of the power supply line 42. The cut-off unit 44 cuts off conduction of the power supply line 42 based on a signal from the control unit 41. The cut-off unit 44 includes switching elements 44a and 44b (cutoff switching elements) connected in series such that the switching elements 44a and 44b have opposite polarities to each other.

The inverter unit 45 includes six switching elements 45a, 45b, 45c, 45d, 45e, and 45f (examples of the "driving switching element" in the claims). In the inverter unit 45, similarly to the inverter unit 35, the switching elements 45a, 45c, and 45e (examples of the "first driving switching element" in the claims) on an upper arm side are connected in series with the switching elements 45b, 45d, and 45f (examples of the "second driving switching element" in the claims) on a lower arm side, respectively. That is, the inverter unit 45 constitutes a two-level three-phase inverter circuit by the six switching elements 45a to 45f. The U-phase electric power, the V-phase electric power, and the W-phase electric power from the inverter unit 45 are output to the coils U2, V2, and W2 of the motor 11, respectively.

The control unit 41 outputs a signal for controlling switching operations of the inverter unit 45 to the driver 46. In addition, the control unit 41 outputs, to the switching elements 44a and 44b of the cut-off unit 44, a signal for controlling a cutoff operation for the conduction of the power supply line 42 that is executed by the cut-off unit 44.

Determination of Power Supply Abnormality

The shift device 100 according to the present embodiment determines a power supply abnormality when the voltage of the input electric power is smaller than a predetermined threshold value due to an abnormality such as disconnection in each of the first system group 30 and the second system group 40. In the following description, a case will be described in which the power supply abnormality is determined on a first system group 30 side.

In the present embodiment, in a state in which the electric power from both the inverter unit 35 in the first system group 30 and the inverter unit 45 in the second system group 40 is output to the motor 11, the control unit 31 determines the abnormality of the power supply line 32 in the first system group 30 when the voltage of the power supply line 32 in the first system group 30 is smaller than the predetermined threshold value.

Figure 5:
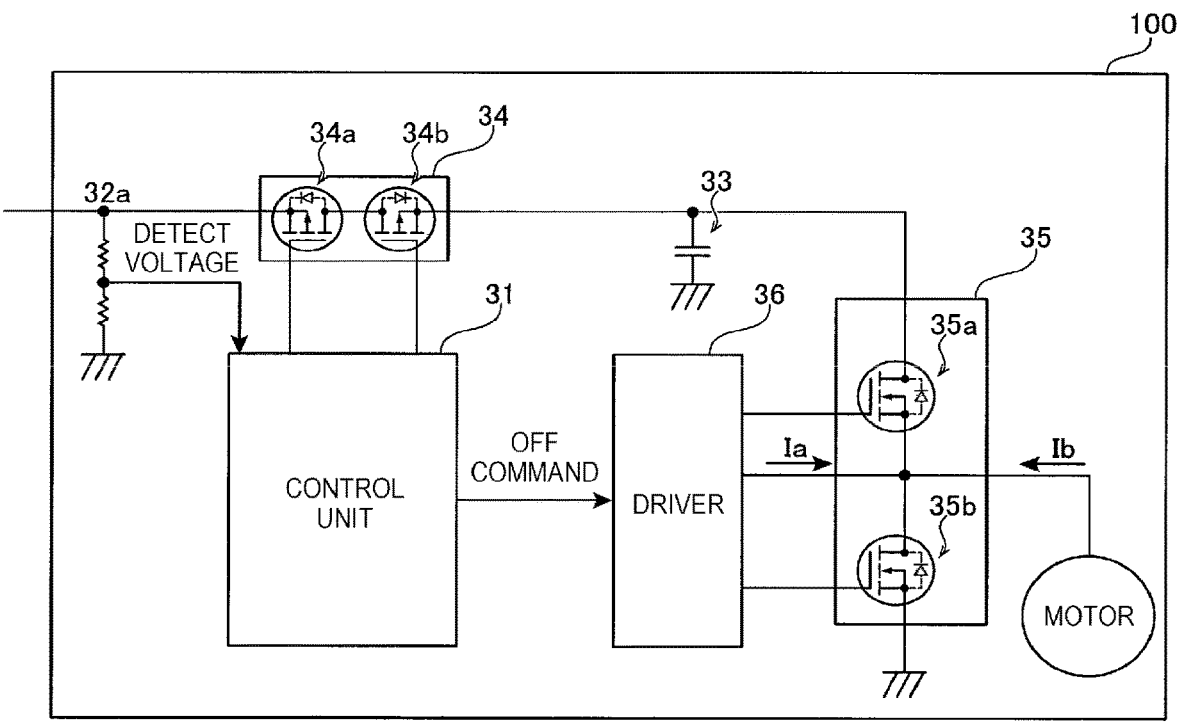
FIG. 5 is a circuit diagram showing an increase in a voltage of a power supply line according to the embodiment.

As shown in FIG. 5, specifically, the control unit 31 determines the abnormality of the power supply line 32 when the voltage at the detection point 32a of the power supply line 32 on the power supply 104 side with respect to the cut-off unit 34 is smaller than the predetermined threshold value. The predetermined threshold value is stored in advance in the control unit 31. In FIG. 5, only the U phase (switching elements 35a and 35b) of the first system group 30 is shown. The V phase (switching elements 35c and 35d) and the W phase (switching elements 35e and 35f) execute the same operation, and thus the illustration is omitted.

In the present embodiment, the control unit 31 executes a control (OFF command) of turning off the switching elements 35a to 35f provided in the inverter unit 35 when determining the abnormality of the power supply line 32. Specifically, when determining the abnormality of the power supply line 32, the control unit 31 turns off all of the switching elements 35a to 35f (on both the upper arm side and the lower arm side) to bring the motor 11 into a free state.

Here, in a circuit configuration such as the shift device 100, when the switching elements 35a to 35f are turned off in order to bring the motor 11 into the free state, a leakage current Ia may flow from the driver 36 into the power supply line 32. For example, since the parasitic diode is present in the switching element 35a on the upper arm side, the leakage current Ia flows into the input side (smoothing capacitor 33 or the like) even when the switching element 35a is turned off. Then, the voltage of the power supply line 32 increases due to the leakage current Ia. Even when no parasitic diode is present in the switching element 35a, the leakage current Ia may flow into the power supply line 32 through a free wheeling diode connected in parallel with the switching element 35a.

When determining the power supply abnormality in the first system group 30, the shift device 100 turns off the inverter unit 35 in the first system group 30 and supplies the electric power only from the inverter unit 45 in the second system group 40 to the motor 11. Therefore, even when the output from the inverter unit 35 in the first system group 30 is stopped (when the switching elements 35a to 35f are turned off), the motor 11 continues being driven by the electric power supplied from the second system group 40. Therefore, a counter electromotive force is generated on the first system group 30 side due to the driving of the motor 11. A reverse current Ib flows into the power supply line 32 due to the counter electromotive force. The reverse current Ib increases the voltage of the power supply line 32 in the same manner as the leakage current Ia.

In the present embodiment, when determining the abnormality of the power supply line 32, the control unit 31 executes the control of turning off the switching elements 35a to 35f provided in the inverter unit 35, and executes a control of cutting off the conduction of the power supply line 32 by the cut-off unit 34. Specifically, the control unit 31 turns off both the two switching elements 34a and 34b of the cut-off unit 34 when determining the abnormality of the power supply line 32.

That is, when determining the abnormality of the power supply line 32, the control unit 31 turns off the output from the inverter unit 35, and causes the cut-off unit 34 to cut off the conduction of the power supply line 32 in order to prevent an erroneous determination of recovery of the power supply caused by the leakage current Ia or the reverse current Ib flowed into the power supply line 32. That is, by causing the cut-off unit 34 to cut off the conduction of the power supply line 32, the control unit 31 can determine the power supply abnormality by detecting only an increase in the voltage (recovery of the power supply) on the input side (power supply 104 side) with respect to the cut-off unit 34 without detecting an increase in the voltage on an output side (motor 11 side) with respect to the cut-off unit 34.

When determining the abnormality of the power supply line 32, the shift device 100 outputs abnormality determination information indicating that the power supply abnormality is determined to a vehicle-side control device (ECU: electronic control unit) (not shown) outside the shift device 100. When acquiring the abnormality determination information, the vehicle-side control device causes, for example, a display device (not shown) to display, to the occupant, a display indicating that the power supply abnormality of the shift device 100 occurs.

Method for Determining Power Supply Abnormality According to Present Embodiment

Figure 6:
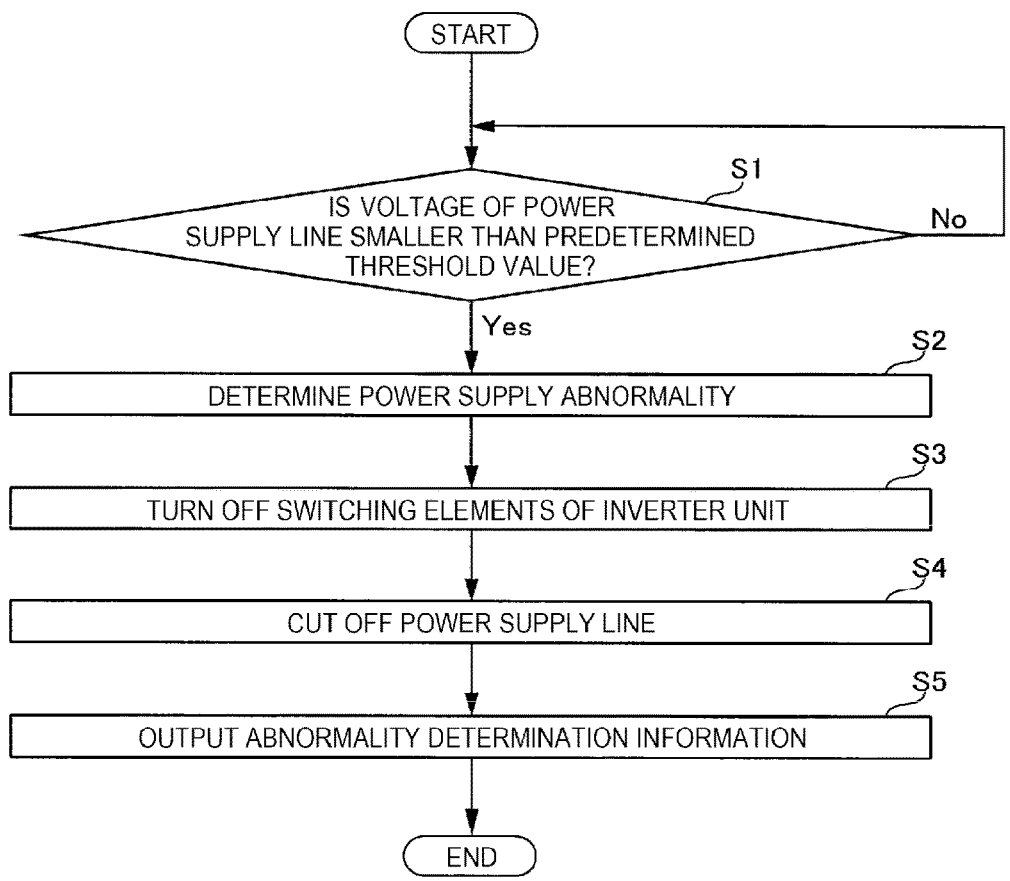
FIG. 6 is a flowchart showing an abnormality determination process of the shift device according to the embodiment.

A control process of the method for determining the power supply abnormality of the motor 11 (vehicular motor) by the control unit 31 will be described below with reference to FIG. 6. In the following process, the case will be described in which the power supply abnormality is determined in the power supply line 32 in the first system group 30.

First, in step S1, it is determined whether the voltage of the power supply line 32 that supplies the electric power from the power supply 104 mounted on the vehicle 110 to the motor 11 is smaller than the predetermined threshold value. When it is determined that the voltage of the power supply line 32 is smaller than the predetermined threshold value, the process proceeds to step S2. When it is determined that the voltage of the power supply line 32 is not smaller than the predetermined threshold value, the process in step S1 is repeated.

In step S2, the power supply abnormality of the power supply line 32 is determined based on a matter that the voltage of the power supply line 32 is smaller than the predetermined threshold value. That is, it is determined that the power supply abnormality occurs in the power supply line 32.

Next, in step S3, when the abnormality of the power supply line 32 is determined, the switching elements 35a to 35f, which are provided in the inverter unit 35 outputting the electric power from the power supply 104 to the motor 11, are turned off.

Next, in step S4, when the abnormality of the power supply line 32 is determined, the conduction of the power supply line 32 is cut off. Specifically, the switching elements 34a and 35b of the cut-off unit 34 are turned off.

Next, in step S5, the abnormality determination information indicating that the power supply abnormality is determined in the power supply line 32 in the first system group 30 is output to the vehicle-side control device (not shown) outside the shift device 100.

In step S3, any one of the control of turning off the switching elements 35a to 35f of the inverter unit 35 and the control of cutting off the conduction of the power supply line 32 by the cut-off unit 34 in step S4 may be executed first. In addition, the process in step S3 and the process in step S4 may be executed substantially at the same time.

In the above description, the case is described in which the power supply abnormality is detected in the power supply line 32 in the first system group 30, and the same control process is executed by the control unit 41 when the power supply abnormality is detected in the power supply line 42 in the second system group 40. That is, when the voltage of the power supply line 42 in the second system group 40 is smaller than the predetermined threshold value, the control unit 41 determines the power supply abnormality of the power supply line 42 in the second system group 40. When determining the power supply abnormality of the power supply line 42, the control unit 41 turns off the switching elements 45a to 45f (driving switching elements) of the inverter unit 45 (drive circuit unit), and turns off the switching elements 44a and 44b (cutoff switching elements) of the cut-off unit 44. Accordingly, the conduction of the power supply line 42 is cut off.

Effects According to Present Embodiment

In the present embodiment, the following effects can be attained.

In the present embodiment, as described above, the shift device is configured to determine an abnormality of the power supply line 32 (42) when a voltage of the power supply line 32 (42) is smaller than a predetermined threshold value, turn off the switching elements 35a to 35f (45a to 45f) (driving switching element) provided in the inverter unit 35 (45) (drive circuit unit), and cut off conduction of the power supply line 32 (42) by the cut-off unit 34 (44). Accordingly, the conduction of the power supply line 32 (42) is cut off by the cut-off unit 34 (44), so that the leakage current Ia or the like does not flow into the power supply line 32 (42). Therefore, an erroneous determination of recovery of the power supply 104 (105) can be prevented even when the voltage of the power supply line 32 (42) temporarily increases. Therefore, repetition of a decrease and an increase in the voltage of the power supply line 32 (42) can be prevented, and thus repetition of an abnormality determination and a normality determination for the power supply line 32 (42) can be prevented. As a result, the abnormality of the power supply line 32 (42) can be appropriately detected by preventing the repetition of the abnormality determination and the normality determination for the power supply line 32 (42).

In the present embodiment, as described above, the cut-off unit 34 (44) is configured to cut off the conduction of the power supply line 32 (42) between the power supply 104 (105) and the inverter unit 35 (45) (drive circuit unit). The shift device is configured to determine the abnormality of the power supply line 32 (42) when the voltage of the power supply line 32 (42) on a power supply 104 (105) side with respect to the cut-off unit 34 (44) is smaller than the predetermined threshold value, turn off the switching elements 35a to 35f (45a to 45f) (driving switching elements) provided in the inverter unit 35 (45), and cut off the conduction of the power supply line 32 (42) by the cut-off unit 34 (44). Accordingly, since the abnormality of the power supply line 32 (42) is determined when the voltage of the power supply line 32 (42) on the power supply 104 (105) side with respect to the cut-off unit 34 (44) is smaller than the predetermined threshold value, the conduction of the power supply line 32 (42) is cut off by the cut-off unit 34 (44). Accordingly, an erroneous determination that the power supply line 32 (42) is normal can be effectively prevented when the voltage of the power supply line 32 (42) on an inverter unit 35 (45) side with respect to the cut-off unit 34 (44) temporarily increases. Therefore, the repetition of the abnormality determination and the normality determination for the power supply line 32 (42) can be effectively prevented, and thus the abnormality of the power supply line 32 (42) can be more appropriately detected.

In the present embodiment, as described above, the shift device further includes the control unit 31 (41) configured to detect the voltage of the power supply line 32 (42). The control unit 31 (41) is configured to determine the abnormality of the power supply line 32 (42) when the voltage of the power supply line 32 (42) is smaller than the predetermined threshold value, execute a control of turning off the switching elements 35a to 35f (45a to 45f) (driving switching elements) provided in the inverter unit 35 (45) (drive circuit unit), and execute a control of cutting off the conduction of the power supply line 32 (42) by the cut-off unit 34 (44). Accordingly, since the control unit 31 (41) detects the voltage of the power supply line 32 (42), the control unit 31 (41) can easily determine the abnormality of the power supply line 32 (42). In addition, when determining the abnormality of the power supply line 32 (42), the control unit 31 (41) can easily execute the control of turning off the switching elements 35a to 35f (45a to 45f) and the control of cutting off the conduction of the power supply line 32 (42) by the cut-off unit 34 (44). Therefore, the repetition of the abnormality determination and the normality determination for the power supply line 32 (42) can be easily prevented by the controls executed by the control unit 31 (41), and thus the abnormality of the power supply line 32 (42) can be easily and appropriately detected.

In the present embodiment, as described above, the switching elements 35a to 35f (45a to 45f) (driving switching elements) of the inverter unit 35 (45) (drive circuit unit) are driven by the driver 36 (46), and include the switching elements 35a, 35c, and 35e (45a, 45c, and 45e) (first driving switching elements) on an upper arm side and the switching elements 35b, 35d, and 35f (45b, 45d, and 45f) (second driving switching elements) on a lower arm side that are connected in series to each other, respectively. The shift device is configured to determine the abnormality of the power supply line 32 (42) when the voltage of the power supply line 32 (42) is smaller than the predetermined threshold value, turn off both the switching elements 35a, 35c, and 35e (45a, 45c, and 45e) and the switching elements 35b, 35d, and 35f (45b, 45d, and 45f) provided in the inverter unit 35 (45), and cut off the conduction of the power supply line 32 (42) by the cut-off unit 34 (44). Accordingly, since both the switching elements 35a, 35c, and 35e (45a, 45c, and 45e) on the upper arm side and the switching elements 35b, 35d, and 35f (45b, 45d, and 45f) on the lower arm side of the inverter unit 35 (45) are turned off, it is possible to effectively prevent power supply from the power supply line 32 (42) in which the abnormality occurs to the motor 11. Therefore, it is possible to effectively prevent an influence of the abnormality of the power supply line 32 (42) on an operation of the motor 11. In addition, since the conduction of the power supply line 32 (42) is cut off by the cut-off unit 34 (44) when the abnormality of the power supply line 32 (42) is determined, the erroneous determination of the recovery of the power supply 104 (105) can be prevented even when the voltage of the power supply line 32 (42) temporarily increases due to the leakage current Ia from the driver 36 (46) or the like. Therefore, when both the switching elements 35a, 35c, and 35e (45a, 45c, and 45e) on the upper arm side and the switching elements 35b, 35d, and 35f (45b, 45d, and 45f) on the lower arm side are turned off, the repetition of the decrease and the increase in the voltage of the power supply line 32 (42) can be prevented, and thus the repetition of the abnormality determination and the normality determination for the power supply line 32 (42) can be effectively prevented. As a result, the abnormality of the power supply line 32 (42) can be more appropriately detected.

In the present embodiment, as described above, the shift device includes the first system group 30 including the cut-off unit 34 and the inverter unit 35 (drive circuit unit) and the second system group 40 including the cut-off unit 44 and the inverter unit 45 (drive circuit unit). In a state in which the electric power from both the inverter unit 35 in the first system group 30 and the inverter unit 45 in the second system group 40 is output to the motor 11, the shift device is configured to determine the abnormality of the power supply line 32 in the first system group 30 when the voltage of the power supply line 32 in the first system group 30 is smaller than the predetermined threshold value, turn off the switching elements 35a to 35f (driving switching elements) provided in the inverter unit 35 in the first system group 30, cut off the conduction of the power supply line 32 by the cut-off unit 34 in the first system group 30, and supply the electric power from the inverter unit 45 in the second system group 40 to the motor 11. Accordingly, since the motor 11 can be driven by the electric power from both the first system group 30 and the second system group 40, even when the abnormality occurs in any one of the first system group 30 and the second system group 40, it is possible to continue driving the motor 11 by the other of the first system group 30 and the second system group 40 in which no abnormality occurs. When the abnormality of the power supply line 32 in the first system group 30 is determined, an operation of the inverter unit 35 in the first system group 30 is stopped, so that an output from the inverter unit 35 in the first system group 30 is stopped. In this case, a counter electromotive force may be generated due to the driving of the motor 11 that is driven by the output from the inverter unit 45 in the second system group 40, so that the reverse current Ib may flow from the motor 11 into the power supply line 32 in the first system group 30. In response to this, in the present embodiment, the shift device determines the abnormality of the power supply line 32 in the first system group 30 when the voltage of the power supply line 32 in the first system group 30 is smaller than the predetermined threshold value, turns off the switching elements 35a to 35f provided in the inverter unit 35 in the first system group 30, cuts off the conduction of the power supply line 32 by the cut-off unit 34 in the first system group 30, and supplies the electric power from the inverter unit 45 in the second system group 40 to the motor 11. Therefore, since the conduction of the power supply line 32 is cut off by the cut-off unit 34 in the first system group 30 when the abnormality occurs in the power supply line 32 in the first system group 30, the erroneous determination of the recovery of the power supply 104 can be prevented even when the voltage of the power supply line 32 in the first system group 30 increases due to the counter electromotive force caused by the driving of the motor 11 that is driven by the second system group 40. As a result, in the state in which the electric power from both the first system group 30 and the second system group 40 is output to the motor 11, the repetition of the abnormality determination and the normality determination for the power supply line 32 (42) can also be prevented when the abnormality occurs in the power supply line 32 (42) in any one of the first system group 30 and the second system group 40, and thus the abnormality of the power supply line 32 (42) can be appropriately detected.

Modification

It should be considered that the embodiment disclosed here is examples in all respects and is not restrictive. The scope disclosed here is shown by the claims rather than the description of the embodiment and further includes all changes (modifications) within meaning and scope equivalent to the claims.

For example, in the embodiment, an example is shown in which the control unit 31 (41) controlling the switching operation of the inverter unit 35 (45) detects the voltage of the power supply line 32 (42), but the disclosure is not limited to this example. In the disclosure, a voltage detection unit separate from the control unit 31 (41) may be provided. In this case, the control unit 31 (41) may determine a power supply abnormality by acquiring a detection value obtained by detection executed by the voltage detection unit. The voltage detection unit may include, for example, a comparator, and may output an abnormality detection signal indicating the power supply abnormality to the control unit 31 (41) when the voltage of the power supply line 32 (42) is smaller than a predetermined threshold value.

In the embodiment, an example is shown in which the inverter units 35 (45) (drive circuit units) output a two-level three-phase alternating current, but the disclosure is not limited to this example. For example, the drive circuit unit may be a multi-level inverter having three or more levels. The drive circuit unit may output one-phase alternating-current electric power instead of three-phase alternating-current electric power.

In the embodiment, an example is shown in which the two-system driving shift device 100 includes the first system group 30 and the second system group 40, but the disclosure is not limited to this example. For example, the shift device 100 may be a one-system driving shift device 100 in which the motor 11 is driven by electric power supplied from one system. Even in the case of one-system driving, when the abnormality of the power supply line 32 (42) is determined, the conduction of the power supply line 32 (42) is cut off by the cut-off unit 34 (44) since the voltage of the power supply line 32 (42) increases due to the leakage current Ia from the driver 36 (46). Accordingly, the repetition of the abnormality determination and the normality determination for the power supply line 32 (42) can be prevented.

In the embodiment, an example is shown in which the first system group 30 and the second system group 40 include the control unit 31 and the control unit 41, respectively, but the disclosure is not limited to this example. For example, the first system group 30 and the second system group 40 may be controlled by a common control unit (microcomputer).

In the embodiment, an example is shown in which the electric power from the power supply 104 and the power supply 105 is supplied to the first system group 30 and the second system group 40 that are separate, respectively, but the disclosure is not limited to this example. For example, electric power may be supplied from one power supply common to both the first system group 30 and the second system group 40.

In the embodiment, an example is shown in which the cut-off unit 34 (44) is the solid state relay including the switching elements 34a and 34b (44a and 44b), but the disclosure is not limited to this example. For example, the cut-off unit 34 (44) may be a mechanical relay. The switching elements 34a and 34b (44a and 44b) of the cut-off unit 34 (44) may be all semiconductor switches that are not limited to the field-effect transistors (FETs).

In the embodiment, an example is shown in which the switching elements 35a to 35f (45a to 45f) of the inverter unit 35 (45) (drive circuit unit) are the field effect transistors (FETs), but the disclosure is not limited to this example. For example, the switching elements (driving switching elements) provided in the inverter unit 35 (45) may be all semiconductor switches that are not limited to the FETs.

In the embodiment, an example of determination for the power supply abnormality in the shift device 100 for an automobile is shown, but the disclosure is not limited to this example. For example, the shift device may be mounted on a vehicle other than the automobile, such as a train. In addition, the determination for the power supply abnormality according to the disclosure may be applied to a vehicular motor control device other than the shift device, such as an electric power steering device.

In the embodiment, for convenience of description, an example is shown in which the control process executed by each of the control unit 31 and the control unit 41 is described using a flow-driven type flowchart for sequentially executing the process according to the process flow, but the disclosure is not limited to this example. In the disclosure, the control process executed by the control unit may be executed by an event-driven type process for executing the process in event units. In this case, the process may be executed in a completely event-driven type, or may be executed by combining the event-driven type and the flow-driven type.

A shift device according to a first aspect of the disclosure is a shift device mounted on a vehicle. The shift device includes: a motor configured to drive, by electric power supplied from a power supply that is mounted on the vehicle, a shift switching member configured to switch shift positions; a cut-off unit configured to cut off conduction of a power supply line through which the electric power from the power supply is supplied to the motor; and a drive circuit unit configured to output the electric power from the power supply to the motor and including a driving switching element configured to execute a switching operation. The shift device is configured to determine an abnormality of the power supply line when a voltage of the power supply line is smaller than a predetermined threshold value, turn off the driving switching element provided in the drive circuit unit, and cut off the conduction of the power supply line by the cut-off unit.

As described above, the shift device according to the first aspect of the disclosure determines the abnormality of the power supply line when the voltage of the power supply line is smaller than the predetermined threshold value, turns off the driving switching element provided in the drive circuit unit, and cuts off the conduction of the power supply line by the cut-off unit. Accordingly, since the conduction of the power supply line is cut off by the cut-off unit, a leakage current or the like does not flow into the power supply line. Therefore, an erroneous determination of recovery of the power supply can be prevented even when the voltage of the power supply line temporarily increases. Therefore, repetition of a decrease and an increase in the voltage of the power supply line can be prevented, and thus repetition of an abnormality determination and a normality determination for the power supply line can be prevented. As a result, the abnormality of the power supply line can be appropriately detected by preventing the repetition of the abnormality determination and the normality determination for the power supply line.

Preferably, in the shift device according to the first aspect, the cut-off unit is configured to cut off the conduction of the power supply line between the power supply and the drive circuit unit, and includes two cutoff switching elements. The two cutoff switching elements are connected in series such that the two cutoff switching elements have opposite polarities to each other.

According to this configuration, the conduction of the power supply line can be cut off by the cutoff switching element that is a semiconductor element unlike a mechanical relay and without wear of a contact. Therefore, a frequency of replacing or repairing the cut-off unit can be further reduced using the cutoff switching element that has a longer service life than a service life of the mechanical relay. Therefore, a work load caused by replacement or repair of the cut-off unit can be reduced.

Preferably, in the shift device according to the first aspect, the shift device is configured to determine the abnormality of the power supply line when the voltage of the power supply line on a power supply side with respect to the cut-off unit is smaller than the predetermined threshold value, turn off the driving switching element provided in the drive circuit unit, and cut off the conduction of the power supply line by the cut-off unit.

Accordingly, since the abnormality of the power supply line is determined when the voltage of the power supply line on the power supply side with respect to the cut-off unit is smaller than the predetermined threshold value, the conduction of the power supply line is cut off by the cut-off unit. Accordingly, an erroneous determination that the power supply line is normal can be effectively prevented when the voltage of the power supply line on the drive circuit unit side with respect to the cut-off unit temporarily increases. Therefore, the repetition of the abnormality determination and the normality determination for the power supply line can be effectively prevented, and thus the abnormality of the power supply line can be more appropriately detected.

Preferably, the shift device according to the first aspect further includes a control unit configured to detect the voltage of the power supply line. The control unit is configured to determine the abnormality of the power supply line when the voltage of the power supply line is smaller than the predetermined threshold value, execute a control of turning off the driving switching element provided in the drive circuit unit, and execute a control of cutting off the conduction of the power supply line by the cut-off unit.

According to this configuration, since the control unit detects the voltage of the power supply line, the control unit can easily determine the abnormality of the power supply line. In addition, when determining the abnormality of the power supply line, the control unit can easily execute the control of turning off the driving switching element and the control of cutting off the conduction of the power supply line by the cut-off unit. Therefore, the repetition of the abnormality determination and the normality determination for the power supply line can be easily prevented by the controls executed by the control unit, and thus the abnormality of the power supply line can be easily and appropriately detected.

Preferably, in the shift device according to the first aspect, the driving switching element of the drive circuit unit includes a first driving switching element on an upper arm side and a second driving switching element on a lower arm side that are driven by a driver and are connected in series to each other. The shift device is configured to determine the abnormality of the power supply line when the voltage of the power supply line is smaller than the predetermined threshold value, turn off both the first driving switching element and the second driving switching element that are provided in the drive circuit unit, and cut off the conduction of the power supply line by the cut-off unit.

According to this configuration, since both the first driving switching element on the upper arm side and the second driving switching element on the lower arm side of the drive circuit unit are turned off, it is possible to effectively prevent power supply from the power supply line in which the abnormality occurs to the motor. Therefore, it is possible to effectively prevent an influence of the abnormality of the power supply line on an operation of the motor. In addition, since the conduction of the power supply line is cut off by the cut-off unit when the abnormality of the power supply line is determined, the erroneous determination of the recovery of the power supply can be prevented even when the voltage of the power supply line temporarily increases due to the leakage current or the like from the driver. Therefore, when both the first driving switching element on the upper arm side and the second driving switching element on the lower arm side are turned off, the repetition of the decrease and the increase in the voltage of the power supply line can be prevented, and thus the repetition of the abnormality determination and the normality determination for the power supply line can be effectively prevented. As a result, the abnormality of the power supply line can be more appropriately detected.

Preferably, the shift device according to the first aspect further includes a first system group and a second system group each including the cut-off unit and the drive circuit unit. In a state in which the electric power from both the drive circuit unit in the first system group and the drive circuit unit in the second system group is output to the motor, the shift device is configured to determine the abnormality of the power supply line in the first system group when the voltage of the power supply line in the first system group is smaller than the predetermined threshold value, turn off the driving switching element provided in the drive circuit unit in the first system group, cut off the conduction of the power supply line by the cut-off unit in the first system group, and supply the electric power from the drive circuit unit in the second system group to the motor.

According to this configuration, since the motor can be driven by the electric power from both the first system group and the second system group, even when the abnormality occurs in any one of the first system group and the second system group, it is possible to continue driving the motor by the other of the first system group and the second system group in which no abnormality occurs. When the abnormality of the power supply line in the first system group is determined, an operation of the drive circuit unit in the first system group is stopped, so that the output from the drive circuit unit in the first system group is stopped. In this case, a counter electromotive force may be generated due to the driving of the motor that is driven by the output from the drive circuit unit in the second system group, so that a reverse current may flow from the motor to the power supply line in the first system group. In response to this, in the disclosure, the shift device determines the abnormality of the power supply line in the first system group when the voltage of the power supply line in the first system group is smaller than the predetermined threshold value, turns off the driving switching element provided in the drive circuit unit in the first system group, cuts off the conduction of the power supply line by the cut-off unit in the first system group, and supplies the electric power from the drive circuit unit in the second system group to the motor. Therefore, since the conduction of the power supply line is cut off by the cut-off unit in the first system group when the abnormality occurs in the power supply line in the first system group, the erroneous determination of the recovery of the power supply can be prevented even when the voltage of the power supply line in the first system group increases due to the counter electromotive force caused by the driving of the motor that is driven by the second system group. As a result, in the state in which the electric power from both the first system group and the second system group is output to the motor, the repetition of the abnormality determination and the normality determination for the power supply line can also be prevented when the abnormality occurs in the power supply line in any one of the first system group and the second system group, and thus the abnormality of the power supply line can be appropriately detected.

A vehicular motor control device according to a second aspect of the disclosure includes: a motor configured to be driven by electric power supplied from a power supply that is mounted on a vehicle; a cut-off unit configured to cut off conduction of a power supply line through which the electric power from the power supply is supplied to the motor; and a drive circuit unit configured to output the electric power from the power supply to the motor and including a driving switching element configured to execute a switching operation. The vehicular motor control device is configured to determine an abnormality of the power supply line when a voltage of the power supply line is smaller than a predetermined threshold value, turn off the driving switching element provided in the drive circuit unit, and cut off the conduction of the power supply line by the cut-off unit.

As described above, the vehicular motor control device according to the second aspect of the disclosure determines the abnormality of the power supply line when the voltage of the power supply line is smaller than the predetermined threshold value, turns off the driving switching element provided in the drive circuit unit, and cuts off the conduction of the power supply line by the cut-off unit. Accordingly, since the conduction of the power supply line is cut off by the cut-off unit, a leakage current or the like does not flow into the power supply line. Therefore, an erroneous determination of recovery of the power supply can be prevented even when the voltage of the power supply line temporarily increases. Therefore, repetition of a decrease and an increase in the voltage of the power supply line can be prevented, and thus repetition of an abnormality determination and a normality determination for the power supply line can be prevented. As a result, it is possible to provide the vehicular motor control device that can appropriately detect the abnormality of the power supply line by preventing the repetition of the abnormality determination and the normality determination for the power supply line.

The shift device according to the first aspect and the vehicular motor control device according to the second aspect may have the following configuration.

APPENDIX 1

A method for determining a power supply abnormality of a vehicular motor according to another aspect of the disclosure includes: a step of determining an abnormality of a power supply line through which electric power is supplied from a power supply mounted on a vehicle to a motor, when a voltage of the power supply line is smaller than a predetermined threshold value; a step of turning off a driving switching element that is provided in a drive circuit unit configured to output the electric power from the power supply to the motor, when the abnormality of the power supply line is determined; and a step of cutting off conduction of the power supply line when the abnormality of the power supply line is determined.

As described above, in the method for determining a power supply abnormality of a vehicular motor according to the other aspect of the disclosure, when the abnormality of the power supply line is determined, the driving switching element is turned off. The driving switching element is provided in the drive circuit unit that outputs the electric power from the power supply to the motor. Then, the conduction of the power supply line is cut off. Accordingly, since the conduction of the power supply line is cut off, a leakage current or the like does not flow into the power supply line. Therefore, an erroneous determination of recovery of the power supply can be prevented even when the voltage of the power supply line temporarily increases. Therefore, repetition of a decrease and an increase in the voltage of the power supply line can be prevented, and thus repetition of an abnormality determination and a normality determination for the power supply line can be prevented. As a result, it is possible to provide the method for determining a power supply abnormality of a vehicular motor with which the abnormality of the power supply line can be appropriately detected by preventing the repetition of the abnormality determination and the normality determination for the power supply line.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift device mounted on a vehicle, the shift device comprising:

a motor configured to drive, by electric power supplied from a power supply that is mounted on the vehicle, a shift switching member configured to switch shift positions;

a cut-off unit configured to cut off conduction of a power supply line through which the electric power from the power supply is supplied to the motor;

a drive circuit unit configured to output the electric power from the power supply to the motor and including a driving switching element configured to execute a switching operation; and a control unit configured to
  determine an abnormality of the power supply line when a voltage of the power supply line is smaller than a predetermined threshold value,
  execute a first control to turn off the driving switching element provided in the drive circuit unit when the abnormality is determined, and
  execute a second control to cut off the conduction of the power supply line by the cut-off unit when the abnormality is determined.

2. The shift device according to claim 1, wherein
the cut-off unit is configured to cut off the conduction of the power supply line between the power supply and the drive circuit unit, and includes two cutoff switching elements, and
the two cutoff switching elements are connected in series such that the two cutoff switching elements have opposite polarities to each other.

3. The shift device according to claim 1, wherein
the control unit is configured to determine the abnormality of the power supply line when the voltage of the power supply line on a power supply side with respect to the cut-off unit is smaller than the predetermined threshold value.

4. The shift device according to claim 1, wherein
the control unit is electrically connected to the drive circuit unit and the cut-off unit.

5. The shift device according to claim 1, wherein
the driving switching element of the drive circuit unit includes a first driving switching element on an upper arm side and a second driving switching element on a lower arm side that are driven by a driver and are connected in series to each other, and
the shift device is configured to determine the abnormality of the power supply line when the voltage of the power supply line is smaller than the predetermined threshold value, turn off both the first driving switching element and the second driving switching element that are provided in the drive circuit unit, and cut off the conduction of the power supply line by the cut-off unit.

6. The shift device according to claim 1, further comprising:
a first system group and a second system group each including the cut-off unit and the drive circuit unit, wherein
in a state in which the electric power from both the drive circuit unit in the first system group and the drive circuit unit in the second system group is output to the motor, the control unit is configured to determine the abnormality of the power supply line in the first system group when the voltage of the power supply line in the first system group is smaller than the predetermined threshold value, turn off the driving switching element provided in the drive circuit unit in the first system group, cut off the conduction of the power supply line by the cut-off unit in the first system group, and supply the electric power from the drive circuit unit in the second system group to the motor.

7. A vehicular motor control device comprising:
a motor configured to be driven by electric power supplied from a power supply that is mounted on a vehicle;
a cut-off unit configured to cut off conduction of a power supply line through which the electric power from the power supply is supplied to the motor;
a drive circuit unit configured to output the electric power from the power supply to the motor and including a driving switching element configured to execute a switching operation; and
a control unit configured to
  determine an abnormality of the power supply line when a voltage of the power supply line is smaller than a predetermined threshold value,
  execute a first control to turn off the driving switching element provided in the drive circuit unit when the abnormality is determined, and
  execute a second control cut off the conduction of the power supply line by the cut-off unit when the abnormality is determined.

* * * * *